United States Patent [19]  
Embrey et al.

[11] Patent Number: 4,554,422
[45] Date of Patent: Nov. 19, 1985

[54] GEARBOX INDICATOR SWITCH

[75] Inventors: Derek M. Embrey, Lisvane, Wales; Stuart F. Webb, Wokingham, England; Ian J. Bickford, Burpham, England; Argus F. Caxton Doss-Desouza, Camberley, England

[73] Assignee: AB Electronic Components Limited, Glamorgan, Wales

[21] Appl. No.: 536,406

[22] Filed: Sep. 27, 1983

[30] Foreign Application Priority Data

Sep. 29, 1982 [GB] United Kingdom ............... 8227822

[51] Int. Cl.⁴ ................. H01H 3/16; B60Q 9/00; G05G 25/00
[52] U.S. Cl. ................. 200/61.91; 200/61.88; 335/206
[58] Field of Search ............ 200/61.88, 61.91, 84 C, 200/81.9 M, 82 E; 335/205, 206, 207; 340/122, 123, 146

[56] References Cited

U.S. PATENT DOCUMENTS 3,646,293  2/1972  Howard ..................... 200/84 C
3,721,929  3/1973  Gabriel et al. ............. 335/206
3,976,963  8/1976  Kubler ..................... 200/84 C X
4,015,226  3/1977  Stomma et al. ............. 335/207 X
4,022,078  5/1977  Malott .................... 335/206 X
4,064,755  12/1977 Bongort et al. ............ 200/84 C X
4,165,501  8/1979  Bongort et al. ............ 335/206
4,227,236  10/1980 Kubler .................... 335/206 X

FOREIGN PATENT DOCUMENTS 3218143  11/1983  Fed. Rep. of Germany ... 200/61.91

Primary Examiner—J. R. Scott
Attorney, Agent, or Firm—Pollock, Vande Sande & Priddy

[57] ABSTRACT

In order to provide a reliable position indicator for a gear control, particularly for automatic transmission motor vehicles, use is made of reed switches (2). These may be mounted in a sealed housing and operable by a magnet (1) from outside the housing. The magnet (1) is movable by and with the gear control. The reed switches (2) may be mounted on a printed circuit board (3) and flux concentrators (4) are preferably provided between adjacent reed switches (2) to shield them until the magnet (1) is closely adjacent.

6 Claims, 3 Drawing Figures

GEARBOX INDICATOR SWITCH

BACKGROUND OF THE INVENTION

This invention relates to gear selector mechanisms having a gearbox indicator switch.

While the invention is primarily described in relation to automatic transmission controls for motor vehicles, it will be appreciated that the principal of the invention may be applied to manual and semi-automatic gear shift systems as well, and also to transmission controls for static installations or water borne or possibly airborne craft.

Most new motor vehicles having automatic transmission are required to have a system to signal which gear position has been selected. In its simplest form this system may only be required to turn on reversing lights. For some automatic and semi-automatic gear system a switch is required for every possible position of the gear selection mechanism. These switches are then used either to generate an indication of the position selected by the driver via simple lamps and/or to provide start inhibit or other interlock functions at particular positions of the gear system.

The general environment of the gear box and transmission is particularly harsh. It is generally beneath the vehicle where oil, water and dirt can accumulate. For standard mechanical switch mechanisms, this poses a problem of adequate sealing against the ingress of foreign matter which over a period of time would impair the function of the switch.

SUMMARY OF THE INVENTION

In accordance with the present invention, there is provided a gear selection mechanism including a gearbox indicator switch device having a magnet movable with a manually operable gear selection control, a series of reed switches selectively operable by the magnet at one of a series of preset positions of the gear selection control, and circuit components connecting the reed switches to provide indicating and/or interlock functions.

It has been found that a magnetically operable reed switch is very well adapted to operate in the harsh environment adjacent a motor vehicle gearbox, since the contacts are sealed in a glass envelope and no physical contact is required to operate them. The reed switches may be further enclosed in a sealed housing, with a magnet outside.

Flux concentrators are preferably provided between adjacent reed switches to provide substantial magnetic shielding to enable the adjacent reed switches to be located close together without substantial risk of ambiguous operation.

Preferably the reed switches are mounted on printed circuit boards with other circuit elements.

For use with an automatic transmission of a motor vehicle, the reed switches would normally be mounted in a single line, but for a manual gearbox they could be mounted in any suitable arrangement to provide the required functions.

DESCRIPTION OF THE FIGURES

The invention will be further described with reference to the accompanying diagrammatic drawings, in which.

DESCRIPTION OF THE PREFERRED EMBODIMENT

Figure 1:
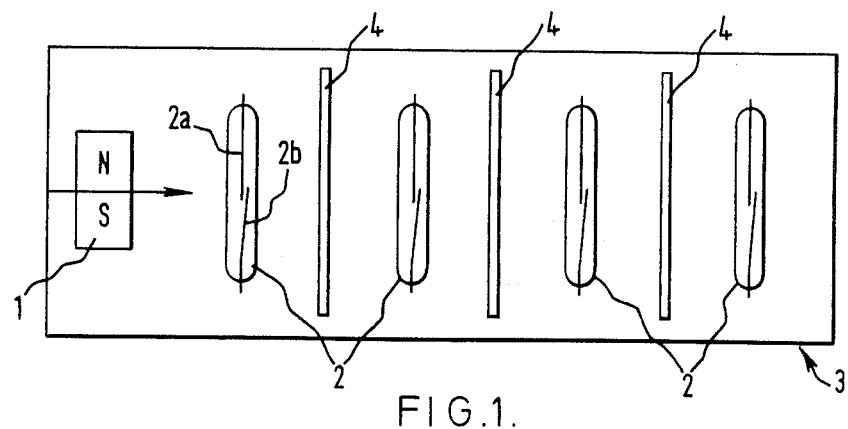
FIG. 1 is a plan view of a simple layout illustrating the principle of the invention.
Figure 2:
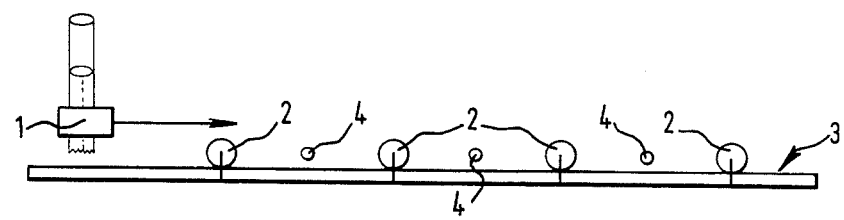
FIG. 2 is an elevational view of the layout of FIG. 1.

In FIGS. 1 and 2 a series of reed switches 2 are shown mounted on a suitable carrier mechanism 3. This carrier 3 is preferably a printed circuit board, which provides an arrangement for mounting and making electrical connection to the reeds. A permanent magnet 1 is caused to pass over the reeds 2a and 2b of the switches 2, in response to the position of the gear selector mechanism. The reeds 2a and 2b will close whenever the magnet is immediately adjacent to them, and if the spacing between the reed switches 2 corresponds with specific positions of the gear selector mechanism a switch function at these positions is achieved.

The mechanism for positioning the magnet is not shown explicitly in FIGS. 1 and 2 and since this will vary with application. Without the need for physical contact between the reed switches and magnet a sealed construction is relatively simple to achieve.

The reed switches 2, printed circuit board 3 and any electronic components associated with them can be in a totally enclosed and sealed container. The only constraint on this container is that it needs to be non-magnetic. A moulded plastics construction is preferred. At least one face of the container is non-magnetic, separating the reed switches from the magnet.

A problem arises if the mechanical constraints of the selector system require the reed switches 2 to be relatively close together. Under these conditions the situation can arise where two or more reed switches 2 are held closed in one position of the magnet 1. The separation between reed switches 2 to give rise to this condition will be a function of magnetic field strength, the field required to operate the reeds, precise configuration of the reeds and other parameters. It is typically less than 10 mm, but will vary considerably. To overcome this constraint, magnetic concentrators 4 are placed between the reed switches 2. These may be simple pieces of ferromagnetic wire or more complex sheets or laminates of ferromagnetic material. By concentrating the stray magnetic flux of the magnet 1 they ensure that only the reed switch closest to the magnet 1 is operated. In this way the pitch between adjacent reed switches 2 can be considerably reduced, while retaining the requisite condition of break before make.

The configuration, size and material of the magnetic concentrators 4 will be dictated by the parameters of the magnet 1 and switches 2 used.

The general configuration shown in FIGS. 1 and 2 can be used in many particular ways.

Figure 3:
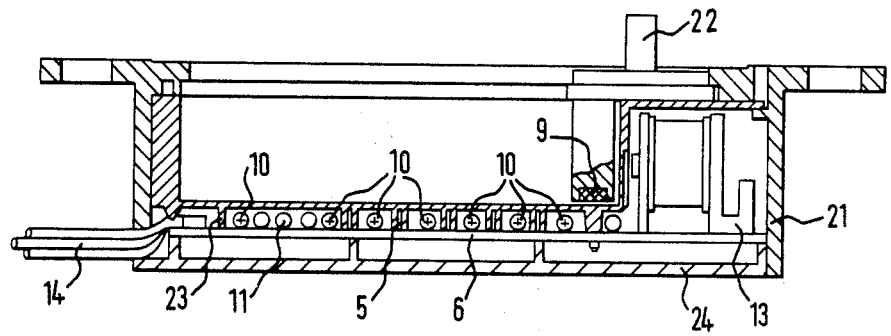
FIG. 3 is a sectional view of a switch mechanism and associated components according to a presently preferred embodiment of the invention.

FIG. 3 shows a particular configuration which employs all the features discussed above. Reed switches 10 are mounted on a printed circuit board 6 which also carries other components e.g. diodes 11 and power relays 13. Between some of the adjacent reed switches 10 are magnetic concentrators 5, between others they are not fitted because the spacing of adjacent reed switches 10 is such that they are not required. The complete assembly of printed circuit board 6 and reed switches 10 is housed in a three part plastics moulding assembly comprising a main housing 21, an inner support 23 and a bottom cover 24. These three components seal the reed switches 10 from ingress of oil, dirt and other foreign matter. Finally, the permanent magnet 9 is carried in another plastic moulding 22 which slides in the main housing component 21. The magnet carrier 22 couples directly to the linear gear selector. By the choice of suitable plastics materials and construction methods, the wear associated with the switch over the life of the vehicle will be negligible. Leads to the printed circuit board 6 are shown at 14.

Various modifications may be made within the scope of the invention described more particularly by the claims which follow.

We claim:

1. In a vehicle having a gear selecting mechanism operated to select a gear position, an improved gear box indicator switch for signaling the identity of a selected gear comprising:
   a magnet coupled to move to one of a plurality of positions in response to a change in position of a gear selector mechanism;
   a plurality of reed switches adjacent said plurality of positions, each of said reed switches being operated when said magnet assumes a respective position, the change in state of a respective reed switch identifying a selected gear; and
   a plurality of flux concentrators which separate said reed switches to provide substantial magnetic shielding between adjacent switches.

2. A gear box indicator switch as claimed in claim 1, in which flux concentrators are provided between adjacent reed switches to provide substantial magnetic shielding between adjacent switches.

3. A gear box indicator switch as claimed in claim 1, in which the reed switches are mounted on at least one printed circuit board with other circuit elements.

4. A gear box indicator switch as claimed in claim 1, in which the reed switches form a linear array and said magnet moves along a line over said array in response to a change in gear selected by an automatic transmission control.

5. A gear box indicator switch as claimed in claim 1, in which the reed switches are mounted in a sealed container having at least one non-magnetic face separating the reed switches from the magnet.

6. In a motor vehicle having a gear transmission which includes a manually operable gear selecting control for selecting an operating gear from a plurality of said gears, an indicator switch for identifying a selected gear comprising:
   a magnet coupled to move with said gear selection control along a path having a plurality of distinct positions for said magnet, each position corresponding to a selected operating gear;
   a plurality of reed switches disposed in an array fixed in a position adjacent said path, each of said reed switches located with respect to one of said positions, whereby said magnet changes the state of only one respective switch for a selected gear, and the selected gear is identified by a change in state of only only of said switches; and
   magnetic concentrators disposed between adjacent reed switches of said array magnetically isolating each of said switches from one another, reducing the required spacing between reed switches, which will permit only one switch to close for each position of said magnet.

* * * * *